(12) United States Patent
Lee et al.

(10) Patent No.: US 11,109,709 B2
(45) Date of Patent: Sep. 7, 2021

(54) GRIDDLE AND COOKING APPLIANCE HAVING A GRIDDLE

(71) Applicant: LG ELECTRONICS INC., Seoul (KR)

(72) Inventors: Kookhaeng Lee, Seoul (KR); Yangho Kim, Seoul (KR); Hyun Woo Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 582 days.

(21) Appl. No.: 15/715,477

(22) Filed: Sep. 26, 2017

(65) Prior Publication Data

US 2018/0353005 A1    Dec. 13, 2018

(30) Foreign Application Priority Data

Jun. 12, 2017   (KR) .................. 10-2017-0073429

(51) Int. Cl.
*A47J 37/06*   (2006.01)
*A47J 27/00*   (2006.01)
(Continued)

(52) U.S. Cl.
CPC ............. *A47J 37/06* (2013.01); *A47J 27/002* (2013.01); *A47J 36/00* (2013.01); *A47J 37/0682* (2013.01); *F24C 15/105* (2013.01)

(58) Field of Classification Search
CPC .......... A47J 27/002; A47J 36/00; A47J 37/06; A47J 37/0682; F24C 15/105
(Continued)

(56) References Cited

U.S. PATENT DOCUMENTS 3,797,375 A * 3/1974 Cerola ................ F24C 15/2042
99/340
4,122,330 A * 10/1978 Fischer ................. F24C 15/105
219/448.11
(Continued)

FOREIGN PATENT DOCUMENTS

CN       201019567     *  3/2007
EP       2 529 649         12/2012
(Continued)

OTHER PUBLICATIONS

Korean Office Action dated Jan. 29, 2018 issued in Application No. 10-2017-0073429.
(Continued)

*Primary Examiner* — Ibrahime A Abraham
*Assistant Examiner* — Frederick F Calvetti
(74) *Attorney, Agent, or Firm* — Ked & Associates LLP

(57) ABSTRACT

A griddle and a cooking appliance having a griddle are provided. The griddle may include a housing having an accommodation space formed therein and an open top, a heating plate formed to have a predetermined width and length and seated on a top of the housing, a burner provided in the housing to heat the heating plate, and a temperature sensor module provided in the housing to measure a temperature of the heating plate. The temperature sensor module may include a cover provided in the housing and having an accommodation space formed therein, and a temperature sensor provided in the housing with at least a portion thereof accommodated in the accommodation space of the cover to measure a temperature of an inside of the cover.

19 Claims, 6 Drawing Sheets

(51) Int. Cl.
*A47J 36/00* (2006.01)
*F24C 15/10* (2006.01)

(58) Field of Classification Search
USPC ................................ 99/422, 331, 332, 333
See application file for complete search history.

(56) References Cited

U.S. PATENT DOCUMENTS

| | | | | |
|---|---|---|---|---|
| 4,502,461 | A * | 3/1985 | Keating | F24C 15/105 126/374.1 |
| 4,815,439 | A | 3/1989 | Houck | |
| 5,522,308 | A * | 6/1996 | Kayashima | G05D 23/2401 99/331 |
| 5,619,910 | A * | 4/1997 | Farnsworth | A47J 37/0682 219/436 |
| 6,150,636 | A * | 11/2000 | Bogdanski | F24C 15/102 219/461.1 |
| 10,499,759 | B2 * | 12/2019 | Cheng | A47J 45/061 |
| 2005/0000957 | A1 * | 1/2005 | Jones | F23D 14/34 219/450.1 |
| 2007/0113838 | A1 * | 5/2007 | Czajka | F24C 3/124 126/273 R |
| 2009/0152260 | A1 * | 6/2009 | Fujinami | H05B 6/062 219/600 |
| 2010/0186603 | A1 * | 7/2010 | Bowles | A47J 37/067 99/422 |
| 2017/0130965 | A1 * | 5/2017 | Eggers | F24C 15/105 |
| 2017/0231415 | A1 * | 8/2017 | Cheng | A47J 45/068 374/141 |
| 2018/0007949 | A1 * | 1/2018 | Sung | A23P 20/20 |
| 2019/0032999 | A1 * | 1/2019 | Hanzawa | F27D 7/02 |
| 2019/0212205 | A1 * | 7/2019 | McColl | A47J 31/44 |
| 2020/0352393 | A1 * | 11/2020 | Sase | A47J 37/06 |

FOREIGN PATENT DOCUMENTS

| | | | |
|---|---|---|---|
| EP | 2529649 | * | 12/2012 |
| FR | 3013423 | * | 11/2013 |
| FR | 3 013 423 | | 5/2015 |
| JP | 09289949 | * | 4/1996 |
| JP | H 0-9289949 | | 11/1997 |
| JP | 2016-202428 | | 12/2016 |
| KR | 10-2015-0131857 | | 11/2015 |

OTHER PUBLICATIONS

Eurpoean Search Report dated Mar. 19, 2018 issued in Application No. 17189455.3.
Korean Notice of Allowance dated Jul. 19, 2018 issued in Application Serial No. 10-2017-0073429.

* cited by examiner

GRIDDLE AND COOKING APPLIANCE HAVING A GRIDDLE

CROSS-REFERENCE TO RELATED APPLICATION(S)

This application claims the priority of Korean Patent Application No. 10-2017-0073429 filed in Korea on Jun. 12, 2017, in the Korean Intellectual Property Office, the disclosure of which is hereby incorporated by reference in its entirety.

BACKGROUND

1. Field

A griddle and a cooking appliance having a griddle are disclosed herein.

2. Background

A cooking appliance, which is a household appliance used to cook food or other items (hereinafter "food"), is installed in a kitchen space and used to cook food as intended by a user. Such cooking appliances can be classified into various types of cooking appliances according to a heat source or shape and types of fuel for cooking.

Cooking appliances can be classified into open-type cooking appliances and closed-type cooking appliances based on how food is cooked, or a type of space in which food to be cooked is placed. The closed-type cooking appliances include ovens and microwaves, and the open-type cooking appliances include cooktops and griddles.

Among these cooking appliances, griddles include a heating means, such as a gas burner or a hot wire, arranged under a cooking plate having an open top. These griddles are used to cook meat and vegetables, for example, on an iron plate-shaped cooking plate heated by the heating means, and are mainly adopted in a large restaurant or a food service station. Recently, household use of the griddles has increased.

Griddles can be classified into electric griddles and gas griddles according to the type of heating means. Among these griddles, the gas griddles include a gas burner arranged under a cooking plate. In the gas griddles, flames generated by burning a gas in the gas burner heat the cooking plate, thereby increasing the temperature of the cooking plate.

An exhaust vent that discharges exhaust gas generated in the gas griddle is formed on or at a back of the gas griddle. The exhaust gas generated in a burning process of the gas burner is moved to the back of the gas griddle along a lower surface of the cooking plate and discharged from the gas griddle through the exhaust vent.

A temperature measurement means to measure the temperature of the cooking plate is also provided inside the gas griddle. The temperature measurement means may directly measure the temperature of the cooking plate using a contact sensor that directly contacts the cooking plate or may be configured to indirectly measure the temperature of the cooking plate using a thermistor to measure the temperature of the air around the cooking plate without directly contacting the cooking plate.

If the temperature measurement means includes a contact sensor, the temperature of the cooking plate may be directly measured, and thus, a reliable result of temperature measurement may be obtained. However, the contact sensor cannot generate an electrical signal related to the result of temperature measurement. Therefore, when the temperature measurement means is the contact sensor, only controlling the operation of the gas burner according to the measured temperature is implementable, and a system for displaying information about the current temperature of the cooking plate, for example, cannot be implemented.

For the griddles, in contrast with other cooking appliances that allow the flames or the temperature to be visually checked, it is difficult to visually check whether the cooking plate is already heated. Accordingly, unless a system for providing information on the temperature of the heating plate is implemented in the griddles, it is difficult for the user to know a condition of the cooking plate, which increases a risk of the user being exposed to an accident, such as burns, for example. On the other hand, when the temperature measurement means includes a thermistor, a system for providing information on the current temperature of the cooking plate for example, may be implemented using the thermistor, which is capable of generating an electrical signal related to a result of temperature measurement.

However, the thermistor indirectly measures the temperature of the cooking plate by measuring the temperature of the air around the cooking plate, rather than directly measuring the temperature of the cooking plate. Accordingly, when the temperature measurement means is the thermistor, an error corresponding to a difference between the actual temperature of the cooking plate and the temperature measured by the temperature measurement means is produced due to the difference in thermal property between the cooking plate in the form of an iron plate and the air whose temperature is measured by the thermistor, which results in low reliability of the temperature measurement performed by the temperature measurement means.

For example, during an initial burning stage during which the gas burner starts burning the gas, a rate of increase of temperature measured by the thermistor is higher than an actual rate of increase of temperature of the cooking plate due to a difference in heat capacity between the cooking plate and air whose temperature is measured by the thermistor. As a result, the measured temperature is higher than the actual temperature of the cooking plate, and thus, temperature control is performed based a temperature lower than the actual temperature of the cooking plate.

Accordingly, the temperature control for concentration of heat for preheating the cooking plate cannot be properly performed at the initial stage, and thus, the time needed to preheat the cooking plate is increased. Moreover, it is difficult to precisely control the temperature of the cooking plate.

BRIEF DESCRIPTION OF THE DRAWINGS

Embodiments will be described in detail with reference to the following drawings in which like reference numerals refer to like elements, and wherein.

DETAILED DESCRIPTION

Figure 1:
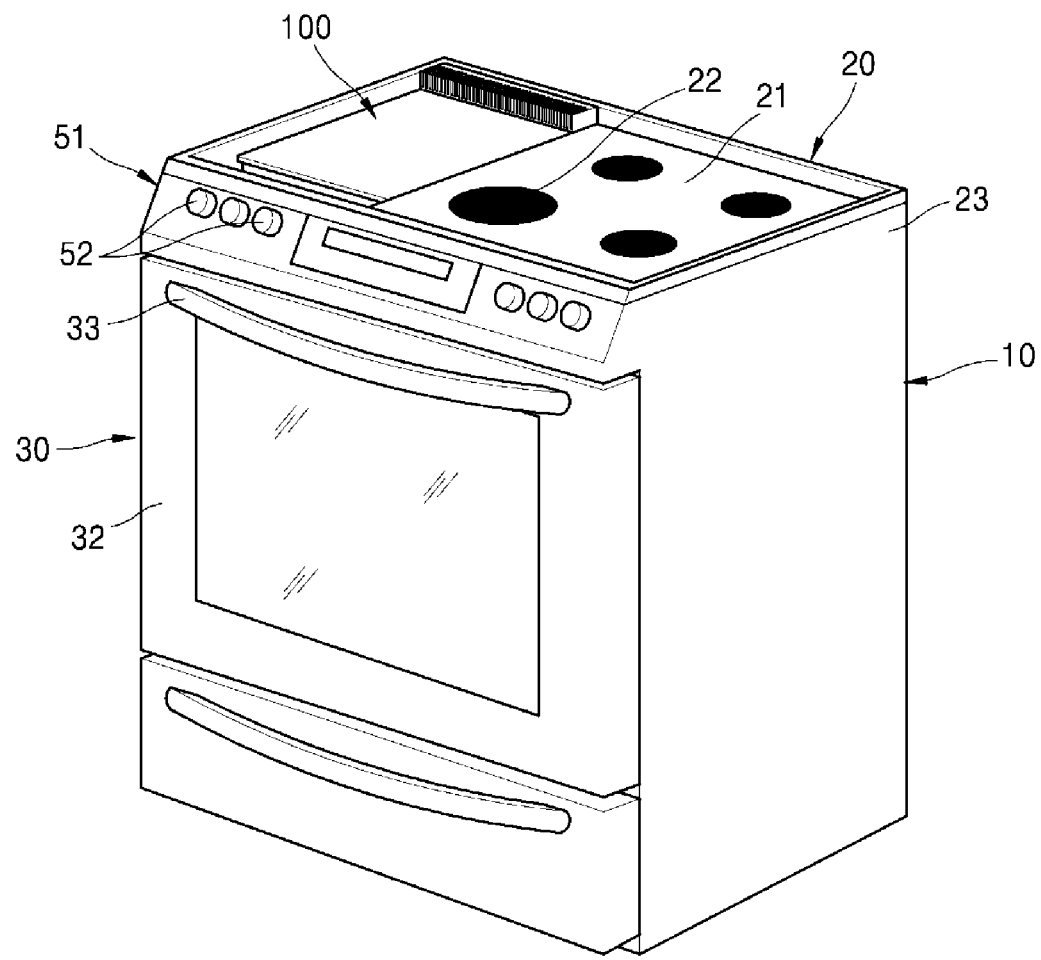
FIG. 1 is a perspective view schematically illustrating a cooking appliance according to an embodiment.
Figure 2:
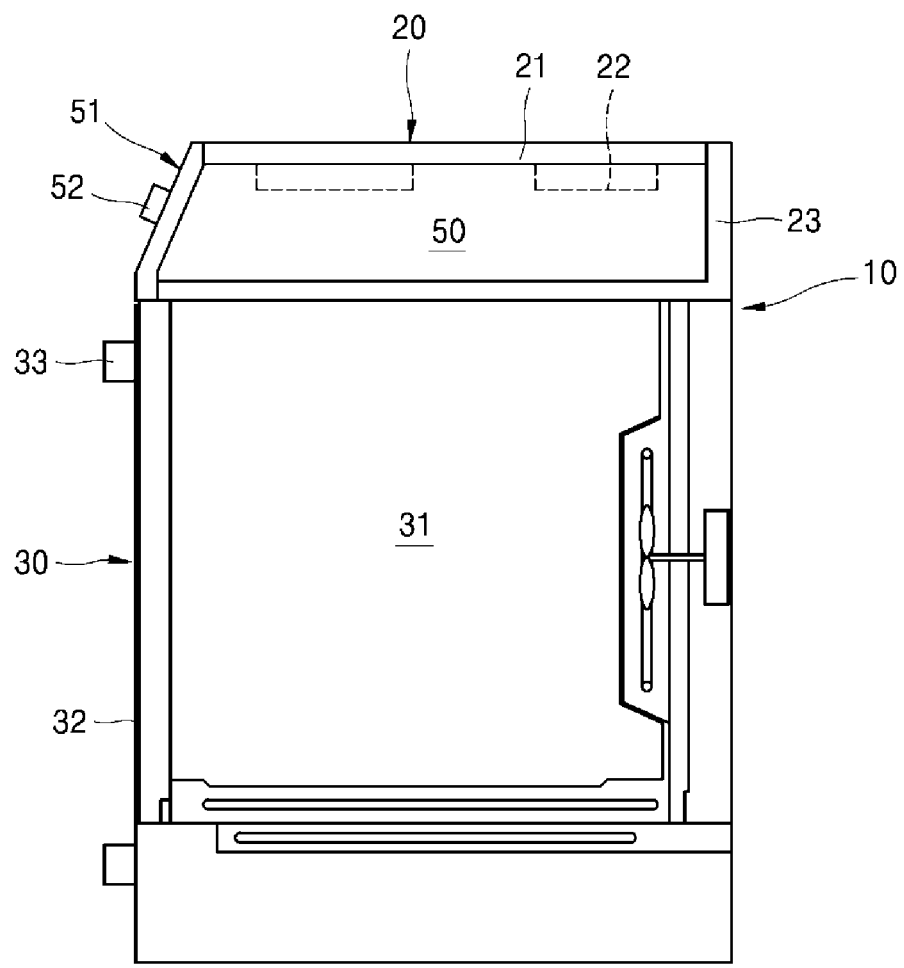
FIG. 2 is a side cross-sectional view illustrating an internal configuration of the cooking appliance according to an embodiment.

FIG. 1 is a perspective view schematically illustrating a cooking appliance according to an embodiment, and FIG. 2 is a side cross-sectional view illustrating an internal configuration of the cooking appliance. Referring to FIGS. 1 and 2, a cooking appliance according to an embodiment may include a body 10, which defines an outer appearance thereof. The body 10 may have a substantially rectangular parallelepiped shape and may be formed of a material having a predetermined strength to protect multiple components provided in an inner space thereof.

A cooktop unit or cooktop 20 may be positioned at an upper end portion of the body 10 and may be configured to cook food by heating the food or a container containing food which is placed in an open space, for example, on the cooktop 20. The cooktop 20 may include an upper plate 21 defining an outer appearance of the upper surface thereof and may support food to be cooked or a container containing food to be cooked.

Food to be cooked or the container containing food may be placed on an upper side of the upper plate 21, and at least one cooktop heating unit or cooktop burner 22 used to heat the food or the container containing food may be positioned on or at a lower side of the upper plate 21. In addition, an oven unit or oven 30 may be provided at a lower side of the cooktop 20. A cooking chamber 31 may be located in an inner space of the oven 30, providing a space where food can be cooked.

The cooking chamber 31 may have a hexahedron shape with an open front face. Food may be cooked by heating an inner space of the cooking chamber 31 while the cooking chamber 31 is shielded or closed. In other words, in the oven 30, the inner space of the cooking chamber 31 may be a space where food is cooked.

A door 32 to selectively open and close the cooking chamber 31 may be pivotably attached to the oven 30. The door 32 may open and close the cooking chamber 31 in a pull-down manner in which an upper end of the door 32 vertically rotates about a lower end of the door 32.

The door 32 may have a hexahedron shape having a predetermined thickness as a whole. A handle 33 may be arranged on a front surface of the door 32 such that a user can grip the handle 33 to pull open the door 32. The user may easily open the door 32 by the handle 33.

A control panel 51 may be provided on or at a front surface of the cooktop 20, that is, on or at an upper side of the door 32. The control panel 51 may have a hexahedron shape with a predetermined inner space. A front surface of the control panel 51 may include an input unit or input 52 through which the user may input operation signals to operate the cooktop 20 and the oven 30.

The input 52 may include a plurality of operation switches, through which the user may directly input operation signals. The control panel 51 may further include a display device or display that provides operation information about the cooking appliance or cooking information about the food, and the user may check various kinds of information about the cooking appliance through the display device.

An electrical component chamber 50 providing a space where electrical component may be positioned may be formed in an inner space of the body 10, namely, a space between the cooktop 20 and the oven 30. The control panel 51 may be provided on the same side as the door 32 to selectively open and close the cooking chamber 31. The control panel 51 may be positioned on or at a front surface of the electrical component chamber 50. The control panel 51 may substantially shield the front surface of the electrical component chamber 50.

According to an embodiment, the cooktop 20 may include the upper plate 21, a cooktop case 23, and the cooktop burner 22. The cooktop case 23 may be arranged between the oven 30 and the upper plate 21 and may have a hexahedron shape having an open top while defining a predetermined inner space under the upper plate 21.

The upper plate 21 may be installed or provided on or at the open top of the cooktop case 23 to cover an upper portion of the cooktop case 23 and at least one cooktop burner 22 may be provided in the inner space of the cooktop case 23. The upper plate 21 may shield the inner space of the cooktop case 23 provided with the cooktop burner 22 and be provided with a through hole allowing a portion of the cooktop burner 22 to be exposed to the outside above the cooktop case 23.

The cooktop burner 22 may include an induction heating module that applies a current to a magnetic coil to generate an eddy current to heat the container to cook food, or may include a radiant heating module to cook food by radiant heat generated by heating a heating coil. Alternatively or additionally, the cooktop burner 22 may include a gas burner that cooks food using a flame generated by burning a gaseous fuel. Alternatively or additionally, the cooktop burner 22 may include a hidden radiant burner which heats the upper plate with a ceramic uniform burner, which uses the energy generated by burning the gaseous fuel, specifically, radiant energy generated by the gaseous fuel rather than using direct heat.

In addition, a griddle apparatus or griddle 100 may be provided on or at a side of the cooktop 20. The griddle 100 may include a burner 130 installed or provided under a heating plate 120, which is arranged such that an upper portion thereof is open. The griddle 100 may be provided on or at the upper portion of the cooking appliance and may be used to grill meat and vegetables, for example. using the heating plate 120 heated by the burner 130.

Similar to the cooktop 20, the griddle 100 may be provided on the oven 30 and may be provided as a part of the cooktop 20 or provided as an apparatus separate from the cooktop 20. For example, when the griddle 100 constitutes a portion of the cooktop 20, the griddle 100 may be installed or provided in the inner space of the cooktop case 23, which defines the outer appearance of the cooktop 20.

In this case, the inner space of the cooktop case 23 may be partitioned into first and second, or left and right areas, and the cooktop 20 may be configured such that the griddle 100 is installed or provided in the first partitioned area and the cooktop burner 22 is installed or provided in the second partitioned area. In this case, the upper plate 21 may cover only the upper portion of the second area where the cooktop burner 22 is arranged, and the griddle 100 may be provided on or at a side of the upper plate 21 so as not to be covered by the upper plate 21.

As another example, when the griddle 100 is provided as an apparatus separate from the cooktop 20, the griddle 100 may be arranged outside the cooktop case 23 such that the griddle 100 is positioned on or at a side of the cooktop case 23 rather than being arranged in the inner space of the cooktop case 23. The griddle 100 may be provided on or at a side of the cooktop case 23 so as not to be covered by the upper plate 21 as in the previous example. The griddle 100 arranged in this way may be used to construct one cooking appliance together with the cooktop 20 and may be separated from the cooktop 20 and used as a separate apparatus, if necessary.

Figure 3:
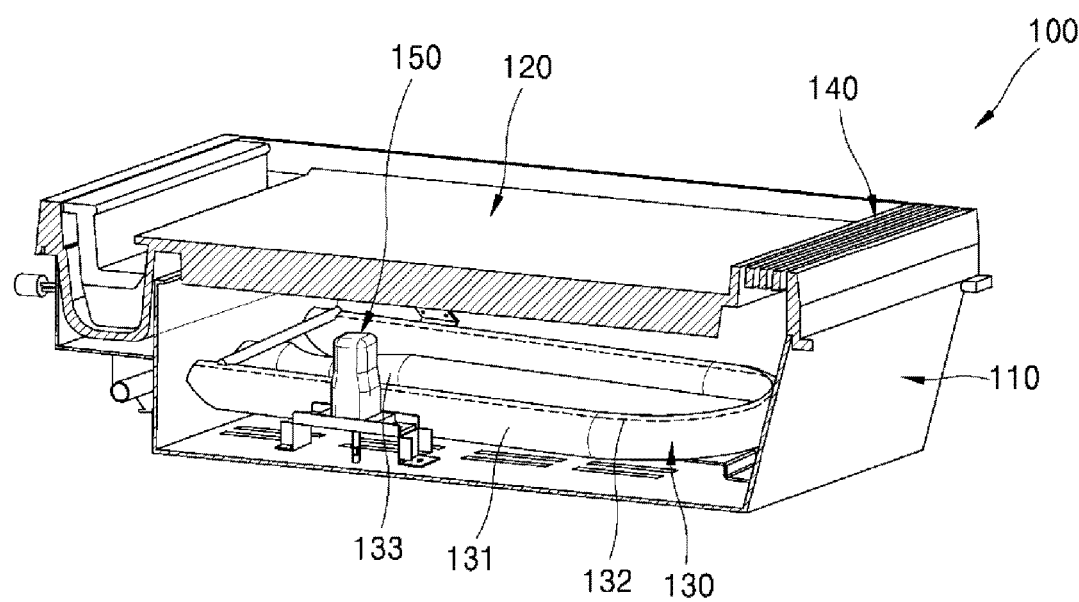
FIG. 3 is a perspective view showing a griddle with a portion of a side surface thereof removed according to an embodiment.

FIG. 3 is a perspective view showing the griddle with a portion of a side surface thereof removed according to an embodiment. Referring to FIGS. 2 and 3, the griddle 100 may include a housing 110, the heating plate 120, the burner 130, an exhaust vent 140, and a temperature measurement module or sensor module 150.

The housing 110 may form an outer profile of the griddle 100 according to an embodiment. The housing 110 may be formed in the shape of a hexahedron defining a predetermined accommodation space under the heating plate 120 and having an open top.

The heating plate 120 may have a predetermined width and length and have a shape, for example, a rectangular shape, corresponding to the shape of the open top of the housing 110. The heating plate 120 may be seated on the open top of the housing 110 such that one longitudinal side of the heating plate 120 is positioned at a front of the housing 110 and an opposite longitudinal side of the heating plate 120 is positioned at a back of the housing 110. The heating plate 120 may be formed of a metal having high strength and heat transfer performance.

The burner 130 may heat the heating plate 120 and may be installed in the housing 110 under or below the heating plate 120. The burner 130 may have a length extending in a first or longitudinal direction of the heating plate 120 and may be a gas burner including a burner body 131, a mixing tube 133, and a nozzle.

The burner body 131 may be a straight pipe having a length extending in the first direction of the heating plate 120. As another example, the burner body 131 may be formed in the shape of a "U" pipe by connecting a pair of straight pipes to form the "U" shape. However, the burner body 131 is not limited to one specific shape.

A flow channel, through which a mixed gas may be supplied, may be formed in the burner body 131 to extend in the first direction. A flame hole 132 may be formed in a side portion of the burner body 131 in a penetrating manner. The flame hole 132 may define a passage through which the gas may be discharged from the burner body 131.

A plurality of flame holes 132 may be arranged in a side portion of the burner body 131 in the first direction of the burner body 131 and spaced apart from each other by a predetermined distance. As a result, a plurality of gas discharge passages may be arranged in the first direction of the burner body 131.

According to this embodiment, the burner body 131 may be supplied with a gas mixed with air, that is, a mixed gas, via the mixing tube 133, which will be described hereinafter. The mixed gas supplied through the flow channel in the burner body 131 may be discharged from the burner body 131 through the flame holes 132 and burned to generate flames on the outside of the burner 130.

The mixing tube 133 may be formed in the shape of a hollow pipe connected to the burner body 131 at a first side thereof. A flow channel in which the gas and air are mixed may be formed in the mixing tube 133. The flow channel formed in the mixing tube 133 may provide a space where gas and air introduced into the mixing tube 133 are mixed with each other while flowing to the burner body 131 through the mixing tube 133.

An air shutter may be provided on or at a second side of the mixing tube 133, opposite the first side, to form a passage through which gas and air may be introduced into the mixing tube 133. The air shutter may have the shape of a hollow tube coupled to the second side of the mixing tube 133 and arranged with a side portion thereof open. External air may be introduced into the mixing tube 133 through the open side portion of the air shutter and an amount of air introduced into the mixing tube 133 may vary depending on a degree of opening of the side portion of the air shutter.

The nozzle may be provided on or at the second side of the mixing tube 133. The nozzle may receive gas through a gas supply pipe and inject the supplied gas into the mixing tube 133. The nozzle may be positioned inside the air shutter, and the gas injected from the nozzle may be introduced into the mixing tube 133 together with air, passing through the inner space of the air shutter.

In the burner 130 having the above configuration, when the gas supplied through the gas supply pipe is injected through the nozzle, the gas injected through the nozzle and the air introduced through the air shutter may be introduced together into the mixing tube 133. The gas and the air introduced into the mixing tube 133 may be mixed while flowing to the burner body 131 through the mixing tube 133. A mixed gas may then be produced. The mixed gas produced in this manner may be supplied into the flow channel in the burner body 131.

The mixed gas supplied into the flow channel in the burner body 131 may be discharged from the burner body 131 through the flame holes 132 and may be burned to generate flames on the outside of the burner 130. Thus, the flames generated by the burner 130 in this manner may generate heat to heat the heating plate 120.

The exhaust vent 140 may form a passage through which exhaust gas produced in the housing 110 by burning in the burner 130 may be discharged from the housing 110, namely from the griddle 100. The exhaust vent 140 may be formed in the shape of a rectangular metal plate elongated in a lateral direction. Exhaust holes in the form of a track-shaped long slot extended in a second direction may be formed in an upper surface of the exhaust vent 140 and arranged in parallel in the second direction.

The exhaust holes may be formed through a piercing process, for example. In this process, a piercing mold may be moved downward from an upper position to cause burs on inner circumferential surfaces of the exhaust holes to face downward, thereby enhancing aesthetic quality of an exterior and preventing sharp burs from being exposed to the outside.

The exhaust vent 140 may be provided on the housing 110 so as to be positioned on a rear portion of the housing 110 adjacent to the opposite longitudinal side of the heating plate 120. The exhaust gas produced in the housing 110 by burning in the burner 130 may be moved to the rear portion of the housing 110 and may be discharged from the griddle 100 through the exhaust vent 140.

The temperature sensor module 150 may be provided in the housing 110 and may measure the temperature of the heating plate 120 while staying in the housing 110. The temperature sensor module 150 may include a thermistor configured to indirectly measure the temperature of the heating plate 120 without direct contact with the heating plate 120. The specific configuration and operation of the temperature sensor module 150 will be described hereinafter.

Figure 4:
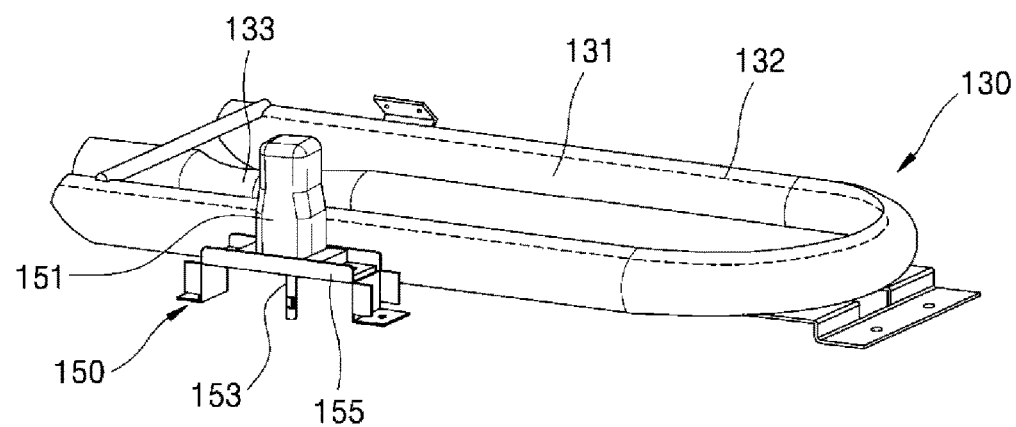
FIG. 4 is a perspective view illustrating a burner and temperature sensor of FIG. 3 separated from each other.
Figure 5:
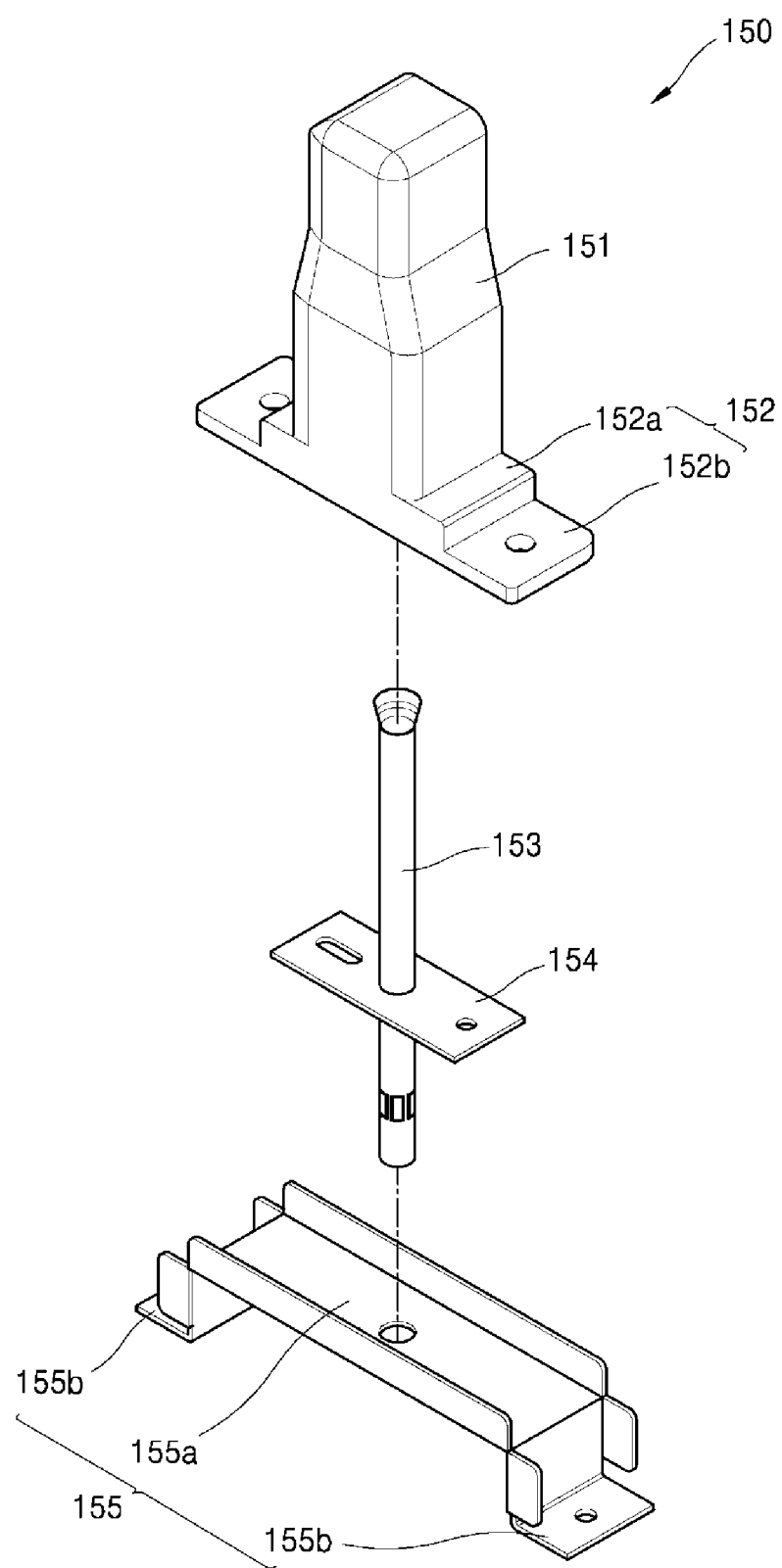
FIG. 5 is an exploded perspective view illustrating temperature sensor shown in FIG. 3.
Figure 6:
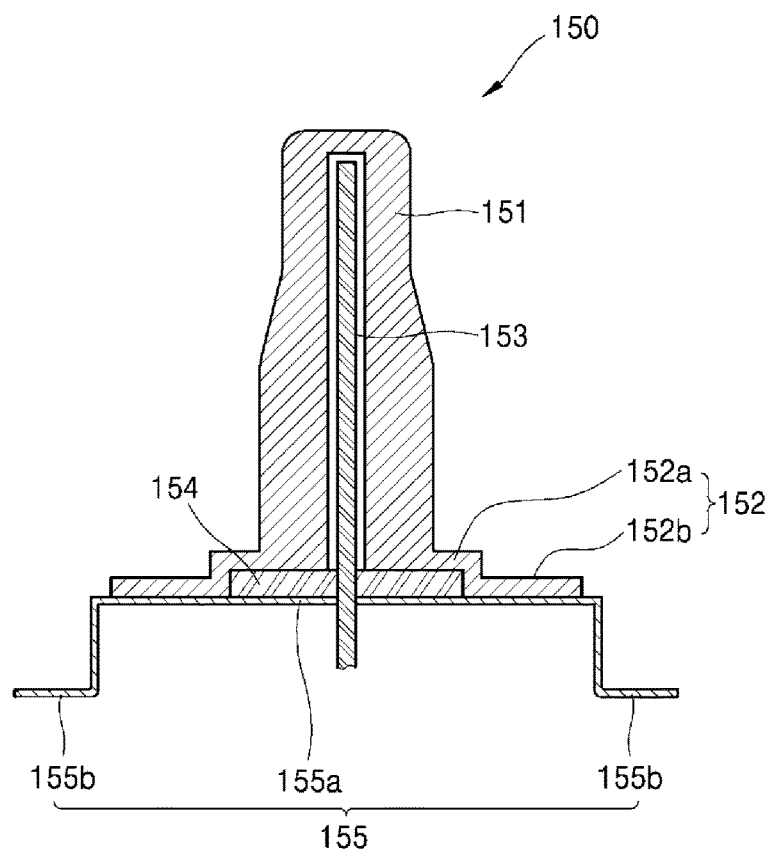
FIG. 6 is a cross-sectional view illustrating the internal structure of the temperature sensor shown in FIG. 3.

FIG. 4 is a perspective view illustrating the burner and the temperature sensor module of FIG. 3 separated from each other, FIG. 5 is an exploded perspective view illustrating the temperature sensor module shown in FIG. 3, and FIG. 6 is a cross-sectional view illustrating the internal structure of the temperature sensor module shown in FIG. 3. Referring to FIGS. 3 to 6, the temperature sensor module 150 may include a cover part or cover 151 and a temperature sensor 153.

The cover 151 may be provided in the housing 110. The cover 151 may be provided at a position which is suitable for the temperature sensor 153 to indirectly measure the temperature of the heating plate 120. A position at which the cover 151 is to be installed may be appropriately selected in consideration of the material, shape, size, and volume of the housing 110, and a volume of an inside of the housing 110, for example.

The cover 151 may define an outer appearance of the temperature sensor module 150, and an accommodation space that accommodates an entirety or a portion of the temperature sensor 153 may be formed therein. The accommodation space formed in the cover 151 may be filled with the entirety or a portion of the temperature sensor 153 and air.

The temperature sensor 153 may be arranged in the housing 110 together with the cover 151. The temperature sensor 153 may be arranged inside the cover 151 in such a manner that at least a portion of the temperature sensor 153 is accommodated in the accommodation space formed in the cover 151. The temperature sensor 153 arranged in this way may indirectly measure the temperature of the heating plate 120 by measuring the temperature of an interior of the cover 151.

According to an embodiment, the temperature sensor 153 may include a thermistor which is arranged inside the cover 151 so as to be accommodated in the accommodation space in the cover 151 and configured to generate an electrical signal corresponding to the temperature of the air in the accommodation space. The cover 151 having the thermistor arranged therein may have a same or equivalent heat capacity as the heating plate 120. The cover 151 may be formed of a material capable of matching temperature rise characteristics of the air in the accommodation space with temperature rise characteristics of the heating plate 120.

For example, the cover 151 may be formed of a same metal as the heating plate 120, or may be formed of a different material having a same heat capacity as the material of the heating plate 120. In order to enhance accuracy of temperature measurement on the heating plate 120 performed by the temperature sensor module 150, not only the material of the cover 151 and an installation arrangement of the temperature sensor 153 but also a position at which the temperature sensor 153 is installed may need to be considered.

In order to enhance the accuracy of the temperature measurement on the heating plate 120 performed by the temperature sensor module 150, a position at which the temperature sensor 153 is to measure the temperature may be appropriately set, and the temperature sensor 153 may be arranged at the set position, for example, a position at which the temperature sensor 153 is subjected to heat equivalent to the heat applied to the heating plate 120 by the burner 130. According to an embodiment, the temperature sensor module 150 may further include a holder 155. The holder 155 may fix the temperature sensor 153 at the set position in the housing 110 such that the temperature sensor 153 is maintained at a set or predetermined height.

The holder 155 may include an upper coupling part or plate 155a forming a surface to be coupled with the cover 151 and a pair of lower coupling parts or plates 155b, by which the upper plate 155a is spaced apart by a predetermined distance from a bottom surface of the housing 110 and the holder 155 is coupled to the bottom surface of the housing 110. The holder 155 may be formed in such a manner that the upper and lower plates 155a and 155b are connected to form a shape of a square bracket open downward. In this case, the lower plates 155b may be provided on both sides of the upper plate 155a, respectively.

Hereinafter, a coupling relationship between the cover 151, the temperature sensor 153 and the holder 155 will be described. Referring to FIGS. 5 and 6, the temperature sensor module 150 may further include a fastening plate 154. According to an embodiment, the temperature sensor 153 may have the form of a rod extending in a third direction, and the fastening plate 154 may have the form of a plate protruding outward from the temperature sensor 153, more specifically, in a transverse direction of the temperature sensor 153. The fastening plate 154 may be positioned at a boundary between a first portion of the temperature sensor 153 inserted into the cover 151 and a second portion thereof.

The cover 151 may include a coupling part or coupler 152 to be coupled with the fastening plate 154 and the holder 155. The coupler 152 may be formed at a lower end portion of the cover 151 to protrude outward in a transverse direction of the cover 151, and may include an inner coupling part or step 152a and an outer coupling part or cover plate 152b.

The step 152a, which is positioned on an inner side in the transverse direction of the coupler 152, may extend from a lower end of the cover 151 to protrude outward in the transverse direction. The step 152a may include a horizontal flat surface protruding outward from the lower end of the cover 151 and a vertical flat surface extending from at an outer end of the horizontal surface in a curved manner.

For example, the steps 152a may extend from the lower end of the cover 151 in the shape of "┌ ┐", e.g. substantially rectangular or stepped. An inside of the step 152a formed in this manner may include a predetermined fitting groove having an upper portion and a side portion surrounded by the step 152a and an open lower portion. The fastening plate 154 may be fitted into the fitting groove.

If the step 152a is formed such that the shape of the fitting groove in the step 152a corresponds to the shape of the fastening plate 154, the fastening plate 154 may be coupled to the step 152a such that the fastening plate 154 is engaged with the interior of the step 152a. In this case, the step 152a and the fastening plate 154 may be effectively guided to the coupling position. Further, once the fastening plate 154 and the coupler 152 are coupled, a passage between the accommodation space in the cover 151 and the outside of the cover 151 may be blocked.

The cover plate 152b, which is positioned on the outer side in the transverse direction of the coupler 152, may be formed on or at an outer side of the step 152a in the transverse direction in a protruding manner. The cover plate 152b may form a horizontal flat surface protruding outward from the step 152a. The cover plate 152b and the holder 155 may be coupled to each other in such a manner that a lower surface of the cover plate 152b and the upper plate 155a, namely, the lower surface of the cover plate 152b and an upper surface of the holder 155 make surface contact with each other.

Coupling between the cover 151, the temperature sensor 153, and the holder 155 may be implemented as follows. The temperature sensor 153 may be inserted into the cover 151 such that a temperature detecting portion of the temperature sensor 153 is positioned in the accommodation space formed in the cover 151. When the temperature sensor 153 is inserted into the cover 151 until the fastening plate 154 is fully inserted into the step 152a, coupling between the cover 151 and the temperature sensor 153 may be temporarily implemented.

The temperature sensor 153 may then be placed at a position between the cover 151 and the holder 155, and the cover plate 152b and the holder 155 may be coupled to each other by a fastening member, such as a screw, with the lower surface of the cover plate 152b and the upper surface of the holder 155 in contact with each other. Thereby, coupling between the cover 151, the temperature sensor 153, and the holder 155 may be implemented.

The fastening plate 154 may be coupled with the step 152a in a fitting manner, thereby blocking the passage connecting the accommodation space in the cover 151 with the outside of the cover 151. The outer side of the fastening plate 154 may be surrounded by a wall formed by the coupler 152 and the holder 155, which may be coupled to each other.

The wall may also form a structure that blocks the passage connecting the accommodation space in the cover 151 and the outside of the cover 151. Thereby, the temperature sensor module 150 may have a double blocking structure in which the passage connecting the accommodation space in the cover 151 and the outside of the cover 151 is primarily blocked by the fastening plate 154 and secondarily blocked by the wall formed by the coupler 152 and the holder 155, which are coupled to each other. Once the holder 155 is coupled to the cover 151 and the temperature measurement sensor 153 is fixed at the set position in the housing 110 as described above, the operation of fixing the temperature sensor module 150 to fix the temperature sensor 153 at the set position may be completed.

Figure 7:
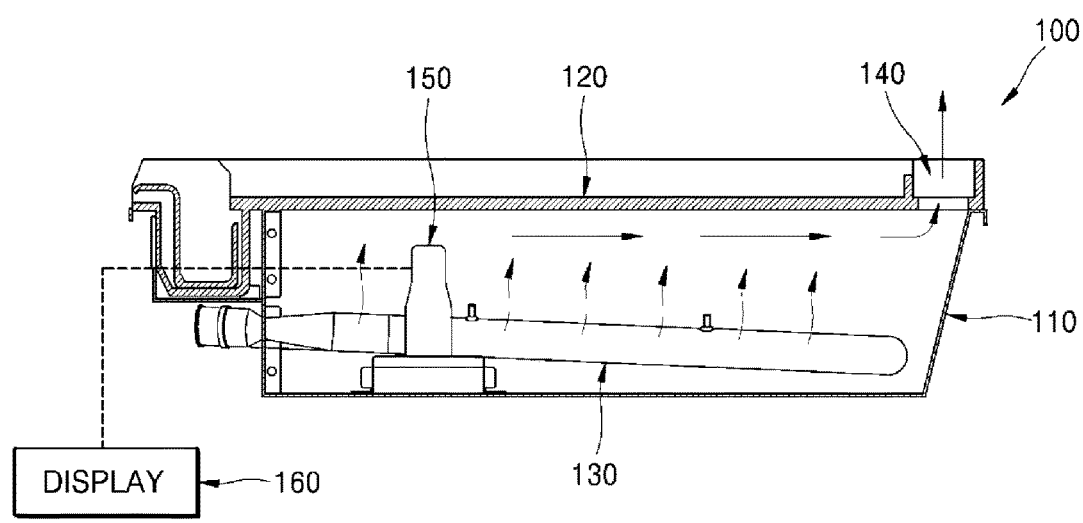
FIG. 7 is a front cross-sectional view illustrating a flow of heat in the griddle shown in FIG. 3.

FIG. 7 is a front cross-sectional view illustrating a flow of heat in the griddle shown in FIG. 3. Referring to FIGS. 6 and 7, when gas is supplied to the burner 130 and burned by the burner 130, the heating plate 120 may be heated by heat generated by burning in the burner 130.

The heat that heats the heating plate 120 may also be transferred to the temperature sensor module 150, and the temperature sensor module 150 may indirectly measure the temperature of the heating plate 120 by the transferred heat. More specifically, while the heating plate 120 is being heated by heat generated by burning in the burner 130, the heat transferred to the temperature sensor module 150 may heat the cover 151, which surrounds the exterior of the temperature sensor module 150, and accordingly the temperature of the cover 151 may increase. The temperature sensor module 150 may be installed or provided at a position such that an equivalent amount of heat is transferred to both the heating plate 120 and the temperature sensor module 150, and accordingly, the cover 151 may be heated equally to the heating plate 120.

Thus, the heat of the cover 151 in the heated state may be transferred to the inside of the cover 151. The heat transferred to the inside of the cover 151 may increase the temperature of the air filling the accommodation space in the cover 151. Then, the temperature detecting portion of the temperature sensor 153 positioned inside the cover 151 may measure the temperature of the air filling the accommodation space in the cover 151. The temperature measurement operation of the temperature sensor 153 may be performed such that the thermistor of the temperature sensor 153 generates an electrical signal corresponding to the temperature of the air filling the accommodation space in the cover 151.

According to an embodiment, the griddle 100 may further include a display unit or display 160 that displays temperature-related information corresponding to the electrical signal generated by the temperature sensor 153. The display 160 may indicate the temperature-related information by a character, a symbol or a picture, by a distinct brightness or color of light, or by voice or sound, for example.

The griddle 100 having the display 160 may provide a system that provides information on the current temperature, for example, of the heating plate 120, thereby providing the user with improved convenience and protecting the user from an accident, such as burns, for example. The temperature sensor 153 may measure the temperature using a thermistor rather than a contact sensor.

As the temperature sensor 153 configured as above generates an electrical signal corresponding to the measured temperature, it may be used to implement a system that provides information on the current temperature, for example, of the heating plate 120 through the display 160. However, as the temperature sensor 153 indirectly measures the temperature of the heating plate 120 by measuring the temperature of the air around the heating plate 120, there may be a difference between the actual temperature of the heating plate 120 and the temperature measured by the temperature sensor 153 and reliability of the temperature sensor 153 may be low if temperature rise characteristics of the heating plate 120 differ from temperature characteristics of the air to be measured by the temperature sensor 153.

In consideration of this fact, the temperature sensor module 150 may be arranged such that the cover 151 covers the temperature sensor 153. The temperature sensor module 150 may then perform indirect temperature measurement on the heating plate 120 in a manner that the temperature sensor 153 measures the temperature of the air filling the accommodation space surrounded by the cover 151.

In addition, the cover 151 arranged to cover the temperature sensor 153 may be formed of a material having a heat capacity equivalent to a heat capacity of the heating plate 120, in other words, a material capable of matching the temperature rise characteristics of the air in the accommodation space therein with the temperature rise characteristics of the heating plate 120. Further, the temperature sensor module 150 may include a double blocking structure in which the passage connecting the accommodation space in the cover 151 and the outside of the cover 151 is primarily blocked by the fastening plate 154 and secondarily blocked by a wall formed by the coupler 152 and the holder 155 which are coupled to each other.

By this blocking structure, direct heat exchange between the air filling the accommodation space in the cover 151 and the air outside the cover 151 may be suppressed, and change in temperature of the air filling the accommodation space in the cover 151 may depend solely on the heat transferred through the cover 151. Thereby, a higher rate of match between the temperature rise characteristics of the air in the accommodation space in the cover 151 and the temperature rise characteristics of the heating plate 120 may be maintained.

By the structure of the temperature sensor module 150 as described above, the temperature rise characteristics of the air in the accommodation space in the cover 151 may be very consistent with the temperature rise characteristics of the heating plate 120. In addition, the temperature measurement sensor 153 installed or provided in the accommodation space of the cover 151 may provide a temperature measurement result accurately reflecting the actual temperature of the heating plate 120 by simply measuring the temperature of the air in the accommodation space, although not directly measuring the temperature of the heating plate 120.

Figure 8:
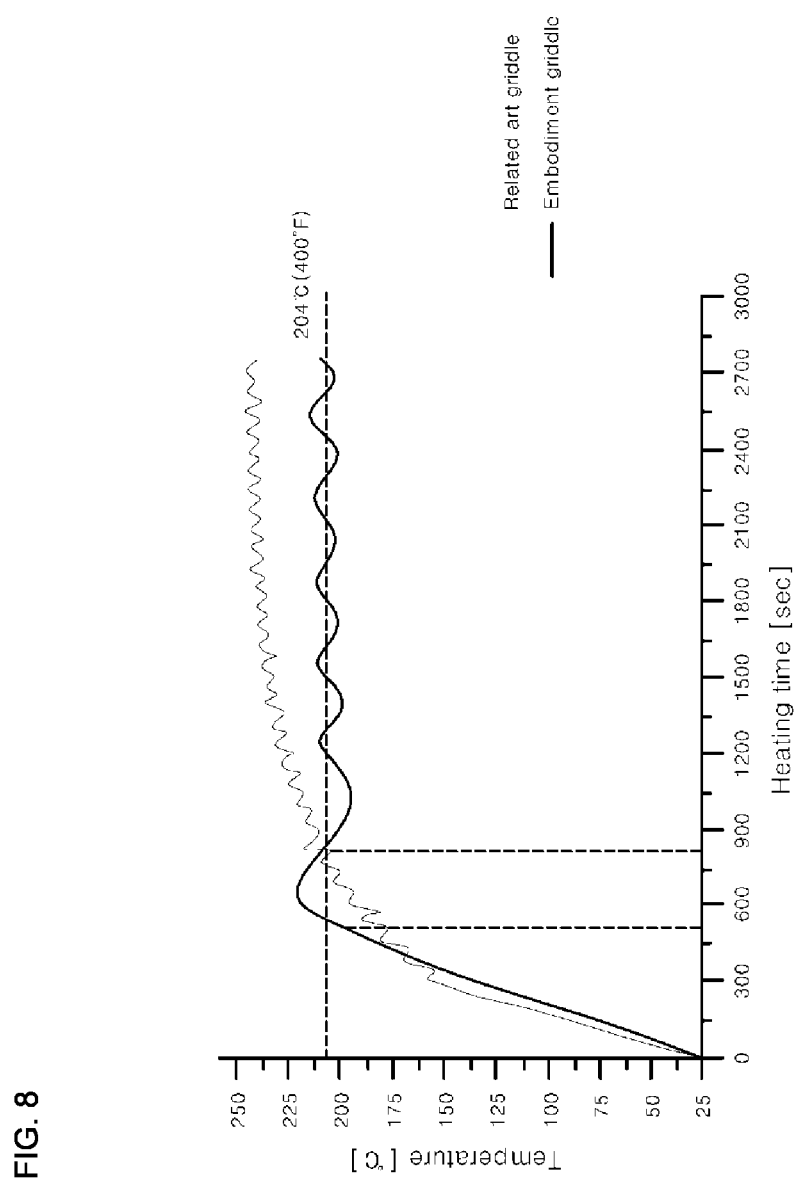
FIG. 8 is a graph comparing temperature rise characteristics of a heating plate measured in a griddle having a temperature sensor according to an embodiment and a griddle having a conventional temperature sensor.

FIG. 8 is a graph comparing temperature rise characteristics of a heating plate measured in a griddle having a temperature sensor module according to an embodiment and a griddle having a related temperature sensor. The graph shows the result of an experiment performing by heating the heating plate 120 with a target heating temperature set to about 400° F. (about 204° C.). The related art temperature sensor used in the experiment is a temperature measurement means having only a thermistor and no other elements, such as the cover 151 of this embodiment. Except for the difference in configuration between the related art temperature sensor and the temperature sensor module 150 of this embodiment, the other experimental conditions are the same.

As a result of the experiment, after heating of the heating plate 120 began, the griddle 100 (hereinafter, referred to as "embodiment griddle") equipped with the temperature sensor module 150 according to an embodiment reached about 400° F., the target heating temperature of the heating plate 120, earlier than the griddle (hereinafter, referred to as "related art griddle") equipped with the conventional temperature sensor. The related art griddle reached the target heating temperature about 200 seconds after the embodiment griddle 100 reached the target heating temperature.

This result is attributed to the difference in temperature measurement result between the temperature sensor module 150 provided in the embodiment griddle 100 and the temperature sensor provided in the related art griddle. Referring to the graph shown in FIG. 8, after the heating plate begins to be heated, the rate of increase of temperature of the heating plate in the related art griddle begins to slow from the moment at which the heating plate reaches 160° C. It can be seen from the graph that the heating plate of the related art griddle reaches the target heating temperature only after an elapsed time of about 800 seconds or more due to the slowed rate of increase of temperature.

In the case of the related art griddle, during the initial burning stage at which the gas burner starts burning the gas, the rate of increase of temperature measured by the temperature sensor is higher than the actual rate of increase of temperature of the cooking plate due to the difference in heat capacity between the heating plate and the air whose temperature is measured by the thermistor. That is, the temperature measured by the temperature sensor reaches the target heating temperature range before the heating plate reaches the target heating temperature range.

Accordingly, even though the heating plate has not actually reached the target heating temperature yet, the related griddle performs a control operation to suppress the temperature rise of the heating plate, misrecognizing that the heating plate has reached the target heating temperature range. According to the experimental results shown in FIG. 8, when the actual temperature of the heating plate reached 160° C. in about 300 seconds after the start of heating, the temperature sensor determined through the measurement that the temperature of the heating plate reached the target heating temperature range, and the related art gridding started a control operation to suppress the temperature rise of the heating plate.

If the control operation to suppress the temperature rise of the heating plate is performed too early as described above, the temperature of the heating plate increases slowly. As a result, the time needed to preheat the heating plate is increased, which leads to an increase in time needed for cooking.

In the case of the related art griddle, after the heating plate is heated to the target heating temperature, that is, after preheating of the heating plate is completed, the rate of decrease of temperature measured by the temperature sensor is higher than the actual rate of decrease of temperature in the heating plate. That is, the temperature measured by the temperature sensor happens to be below the target heating temperature range even when the actual temperature of the heating plate is not below the target heating temperature range, which is attributed to the difference in heat capacity between the heating plate and the air whose temperature is measured by the thermistor.

Thus, the related art griddle performs a control operation to resume heating of the heating plate when the temperature of the actual heating plate is not below the target heating temperature. As a result, as can be seen from the graph shown in FIG. 8, the temperature of the heating plate is controlled in an over-heated state in which the actual temperature of the heating plate is deviated from the target heating temperature by about 30° C. or more.

In contrast, according to the embodiment griddle 100, the result of temperature measurement through the temperature sensor module 150 may reflect the actual temperature of the heating plate 120 with high accuracy, and the temperature control operation may be performed on the heating plate 120 based on the result of temperature measurement with high accuracy. Therefore, the temperature of the heating plate 120 may be controlled with high accuracy, compared to inaccurate control of the temperature of the heating plate performed by the related art griddle based on the measured temperature results, which are different from the actual temperature of the heating plate.

Referring to the graph shown in FIG. 8, in the embodiment griddle 100, after the heating plate 120 starts to be heated, the rate of increase in temperature is not slowed until the temperature of the heating plate 120 reaches the target heating temperature. Accordingly, as can be seen from the graphs, the heating plate 120 of the embodiment griddle 100 reaches the target heating temperature about 200 seconds earlier than the related art griddle.

This is because the result of temperature measurement through the temperature sensor module 150 may reflect the actual temperature of the heating plate 120 with high accuracy and the temperature control operation may be performed on the heating plate 120 based on the result of temperature measurement with high accuracy such that the heating plate 120 is rapidly heated until the temperature of the heating plate 120 reaches the target heating temperature. That is, by performing the temperature control operation on the heating plate 120 based on the result of temperature measurement reflecting the actual temperature of the heating plate 120 with high accuracy, the embodiment griddle 100 may shorten the time needed for preheating, thereby effectively shortening the time needed for cooking.

Also, it can be seen from the experimental result shown in FIG. 8 that, after preheating of the heating plate 120 is completed, the embodiment griddle 100 may maintain the actual temperature of the heating plate 120 within the target heating temperature range, for example, about 400±10° F., compared to the related art griddle, which performs temperature control on the heating plate in an over-heated state in which the actual temperature of the heating plate is deviated from the target heating temperature by about 30° C. or more. This may be because the result of temperature measurement through the temperature sensor module 150 may reflect the actual temperature of the heating plate 120 with high accuracy, and the temperature control operation may be performed on the heating plate 120 by the embodiment griddle 100 based on the result of temperature measurement with high accuracy.

Therefore, in the case of the embodiment griddle 100, precision control of matching the actual temperature of the heating plate 120 with a set temperature with high accuracy may be implemented. According to the griddle 100 and a cooking appliance having the same as described above, the actual temperature of the heating plate 120 may be measured with high accuracy, and temperature control may be implemented with high accuracy based on the result of measurement.

Therefore, the time needed for preheating may be shortened, and accordingly, the time needed for cooking may be effectively shortened. Further, the griddle 100 and the cooking appliance having the same may implement a system that displays information on the current temperature of the heating plate 120, thereby providing users with improved convenience and safety and precisely control the temperature of the actual heating plate 120 to be matched with a set or predetermined temperature with high accuracy.

A cooking appliance having a griddle according to the embodiments disclosed herein may include a housing having an accommodation space formed therein and an open top, a heating plate formed to have a predetermined width and length and seated on the top of the housing, a burner provided in the housing to heat the heating plate, and a temperature sensor module provided in the housing to measure a temperature of the heating plate. The temperature sensor module may include a cover provided in the housing and having an accommodation space formed therein, and a temperature sensor provided in the housing with at least a portion thereof accommodated in the accommodation space of the cover to measure a temperature of an inside of the cover. The cover may have a same heat capacity as the heating plate.

The temperature sensor may include a thermistor installed or provided inside the cover to be accommodated in the accommodation space and configured to generate an electrical signal corresponding to a temperature of air in the accommodation space. The cover may be formed of a material capable of matching temperature rise characteristics of the air in the accommodation space with temperature rise characteristics of the heating plate.

The cooking appliance may further include a display configured to display temperature-related information corresponding to the electrical signal generated by the temperature sensor. The temperature sensor module may further include a holder to fix the temperature sensor to an inside of the housing such that the temperature sensor is maintained at a set or predetermined height.

The cover may be formed of a material capable of matching temperature rise characteristics of air in the accommodation space with temperature rise characteristics of the heating plate. Coupling between the cover and the temperature sensor or coupling between the cover and the holder may be performed such that a passage connecting the accommodation space with an outside of the cover may be blocked. The temperature sensor module may include a fastening plate protruding outward from the temperature sensor. The cover may include a coupler to be coupled with the fastening plate and the holder. The coupler may include a step surrounding an exterior of the fastening plate from an outside and coupled to the fastening plate and a plate formed outside the step and coupled to the holder. The fastening plate may be coupled with the step in a space surrounded by the coupler and the holder coupled to each other to block the passage connecting the accommodation space with the outside of the cover.

A cooking appliance according to embodiments disclosed herein may include a cooktop case, and a griddle installed inside or outside the cooktop case. The griddle may include a housing having an accommodation space formed therein and an open top, a heating plate formed to have a predetermined width and length and seated on the top of the housing, a burner provided in the housing to heat the heating plate, and a temperature sensor module provided in the housing to measure a temperature of the heating plate. The temperature sensor module may include a cover provided in the housing and having an accommodation space formed therein, and a temperature sensor provided in the housing with at least a portion thereof accommodated in the accommodation space to measure a temperature of an inside of the cover. The cooking appliance may further include a cooktop burner installed or provided in the cooktop case. The griddle may be provided adjacent to the cooktop burner. An upper plate may be installed or provided on the cooktop case. The griddle may be provided on or at a side of the upper plate.

A cooking appliance according to the embodiments may include a body, and a griddle installed on the body. The griddle may include a housing having an accommodation space formed therein and an open top, a heating plate formed to have a predetermined width and length and seated on the top of the housing, a burner provided in the housing to heat the heating plate, and a temperature sensor module provided in the housing to measure a temperature of the heating plate. The temperature sensor module may include a cover provided in the housing and having an accommodation space formed therein, and a temperature sensor provided in the housing with at least a portion thereof accommodated in the accommodation space to measure a temperature of an inside of the cover.

With a griddle and a cooking appliance having a griddle according to embodiments, an actual temperature of a heating plate may be measured with high accuracy and high-precision temperature control may be performed based on the measured temperature, thereby shortening a time needed for preheating. Accordingly, a time needed for cooking may be effectively shortened.

In addition, embodiments disclosed herein may enable implementation of a system that provides information on a current temperature of a heating plate, thereby providing a user with improved convenience and safety. In addition, precision control may be implemented by matching the actual temperature of the heating temperature with a set or predetermined temperature with high accuracy.

Embodiments of a griddle and a cooking appliance having a griddle are described with reference to the accompanying drawings. It will be appreciated that for simplicity and clarity of illustration, thicknesses of lines and dimensions of elements shown in the drawings may be exaggerated. In addition, terms used herein are defined in consideration of functions in the embodiments, and may be replaced by other terms based on intensions of a user or operator, and customs, for example. Therefore, the terms used herein should be construed based on the whole content of this specification.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A griddle, comprising:
    a housing that forms a first accommodation space having an open top;
    a heating plate having a predetermined width and length and seated on the top of the housing;
    a burner provided in the housing to heat the heating plate; and
    a temperature sensor module provided in the housing and spaced apart from the heating plate to measure indirectly a temperature of the heating plate, wherein the temperature sensor module includes:
        a cover that forms a sealed second accommodation space and is provided in the housing and spaced apart from the heating plate; and
        a temperature sensor provided in the housing having at least a portion accommodated in the second accommodation space and surrounded by the cover to measure a temperature inside of the cover, wherein the cover has a same heat capacity as the heating plate, and wherein the temperature sensor measures a temperature of air filling the second accommodation space surrounded by the cover.

2. The griddle according to claim 1, wherein the temperature sensor includes a thermistor provided inside the cover and accommodated in the second accommodation space and configured to generate an electrical signal corresponding to the temperature of the air in the second accommodation space.

3. The griddle according to claim 2, wherein the cover is formed of a material capable of matching temperature rise characteristics of the air in the second accommodation space with temperature rise characteristics of the heating plate.

4. The griddle according to claim 2, further including:
    a display configured to display temperature-related information corresponding to the electrical signal generated by the temperature sensor.

5. The griddle according to claim 1, wherein the temperature sensor module further includes:
    a holder that fixes the temperature sensor to an inside of the housing such that the temperature sensor is maintained at a predetermined height.

6. The griddle according to claim 5, wherein the cover is formed of a material capable of matching temperature rise characteristics of the air in the second accommodation space with temperature rise characteristics of the heating plate, and wherein coupling between the cover and the temperature sensor or coupling between the cover and the holder is performed such that a passage connecting the second accommodation space with an outside of the cover is blocked.

7. The griddle according to claim 6, wherein the temperature sensor module includes a fastening plate protruding outward from the temperature sensor, wherein the cover includes a coupler to be coupled with the fastening plate and the holder, wherein the coupler includes a step surrounding an exterior of the fastening plate and coupled to the fastening plate, and a plate formed outside the step and coupled to the holder, and wherein the fastening plate is coupled with the step in a space surrounded by the coupler and the holder coupled to each other to block the passage connecting the second accommodation space with the outside of the cover.

8. A cooking appliance, comprising:
    a cooktop case; and
    a griddle provided inside or outside of the cooktop case, wherein the griddle includes:
        a housing forming a first accommodation space having an open top;
        a heating plate having a predetermined width and length and seated on the top of the housing;
        a burner provided in the housing to heat the heating plate; and
        a temperature sensor module provided in the housing and spaced apart from the heating plate to measure indirectly a temperature of the heating plate, wherein the temperature sensor module includes:
            a cover that forms a sealed second accommodation space and is provided in the housing and spaced apart from the heating plate; and
            a temperature sensor provided in the housing having at least a portion accommodated in the second accommodation space and surrounded by the cover to measure a temperature inside of the cover, wherein the cover has a same heat capacity as the heating plate, and wherein the temperature sensor measures a temperature of air filling the second accommodation space surrounded by the cover.

9. The cooking appliance according to claim 8, further including:
    a cooktop burner provided in the cooktop case, wherein the griddle is provided adjacent to the cooktop burner.

10. The cooking appliance according to claim 8, wherein an upper plate is provided on the cooktop case, and wherein the griddle is provided at a side of the upper plate.

11. The cooking appliance according to claim 8, wherein the temperature sensor includes a thermistor provided inside the cover to be accommodated in the second accommodation space and configured to generate an electrical signal corresponding to the temperature of the air in the second accommodation space.

12. The cooking appliance according to claim 11, wherein the cover is formed of a material capable of matching temperature rise characteristics of the air in the second accommodation space with temperature rise characteristics of the heating plate.

13. The cooking appliance according to claim 11, further including:
a display configured to display temperature-related information corresponding to the electrical signal generated by the temperature sensor.

14. The cooking appliance according to claim 8, wherein the temperature sensor module further includes:
a holder that fixes the temperature sensor to an inside of the housing such that the temperature sensor is maintained at a predetermined height.

15. The cooking appliance according to claim 14, wherein the cover is formed of a material capable of matching temperature rise characteristics of the air in the second accommodation space with temperature rise characteristics of the heating plate, wherein coupling between the cover and the temperature sensor or coupling between the cover and the holder is performed such that a passage connecting the second accommodation space with an outside of the cover is blocked.

16. The cooking appliance according to claim 15, wherein the temperature sensor module includes a fastening plate protruding outward from the temperature sensor, wherein the cover includes a coupler to be coupled with the fastening plate and the holder, wherein the coupler includes a step surrounding an exterior of the fastening plate from an outside and coupled to the fastening plate and a plate formed outside the step and coupled to the holder, and wherein the fastening plate is coupled with the step in a space surrounded by the coupler and the holder coupled to each other to block the passage connecting the second accommodation space with the outside of the cover.

17. A cooking appliance, comprising:
a body; and
a griddle provided on the body, wherein the griddle includes:
 a housing forming a first accommodation space having an open top;
 a heating plate having a predetermined width and length and seated on the top of the housing;
 a burner provided in the housing to heat the heating plate; and
 a temperature sensor module provided in the housing and spaced apart from the heating plate to measure indirectly a temperature of the heating plate, wherein the temperature sensor module includes:
  a cover that forms a second accommodation space, is provided in the housing and spaced apart from the heating plate, and includes a cover plate and a step;
  a temperature sensor provided in the housing having at least a portion accommodated in the second accommodation space and surrounded by the cover to measure a temperature inside of the cover and including a fastening plate from which the temperature sensor protrudes; and
  a holder including an upper plate and a lower plate, wherein the fastening plate is inserted into the step to form a seal between the fastening plate and the step, and the cover plate contacts the upper plate to form a secondary seal to prevent air in the first accommodation space from entering the second accommodation space, wherein the cover has a same heat capacity as the heating plate, and wherein the temperature sensor measures a temperature of air filling the second accommodation space surrounded by the cover.

18. The cooking appliance according to claim 17, further including:
a cooktop case provided at an upper portion of the body; and
a cooktop burner provided at the cooktop case, wherein the griddle is provided adjacent to the cooktop burner.

19. The cooking appliance according to claim 17, further including:
a cooktop case provided at an upper portion of the body; and
an upper plate provided on the cooktop case, wherein the griddle is provided at a side of the upper plate.

* * * * *